April 27, 1948.  J. JANDASEK  2,440,445

FLUID TRANSMISSION

Filed Jan. 31, 1944

INVENTOR.
Joseph Jandasek.
BY
ATTORNEY.

Patented Apr. 27, 1948

2,440,445

UNITED STATES PATENT OFFICE 2,440,445

FLUID TRANSMISSION

Joseph Jandasek, Highland Park, Mich., assignor to Bendix Aviation Corporation, South Bend, Ind., a corporation of Delaware Application January 31, 1944, Serial No. 520,423

4 Claims. (Cl. 103—115)

This invention relates to transmissions and more particularly to a fluid transmission having an impeller capable of changing its effective radius and direction of flow.

Fluid transmissions have heretofore been relatively inefficient over a wide operating range because of the fact that if the impeller was of sufficient diameter to efficiently transmit power at high speeds of operation it was relatively inefficient at slower speeds of operation because of the reduced velocity of fluid flow in the power transmitting fluid circuit.

An object of this invention is therefore to provide a fluid transmission wherein an impeller of relatively small effective diameter is provided for efficient operation at low speeds when the transmission is operating as a torque converter to transmit multiplied torque, and wherein the impeller blades automatically move tangentially outwardly upon increase in speed so as to increase the effective diameter of the impeller so that it may efficiently transmit power at higher speeds of operation when the transmission is operating as a fluid clutch operative to transmit power with substantially no torque multiplication.

Another object of this invention resides in the provision of an impeller operative as a radial flow impeller at slower speeds of operation, and as an axial flow impeller at higher speeds of operation.

Yet another object resides in the provision of a fluid transmission having centrifugally actuated blades movable outwardly in the fluid circuit under the influence of centrifugal force so as to increase the effective diameter of the impeller and to progressively change the direction of fluid flow from the impeller.

Still another object is to provide a fluid transmission having an impeller operative effectively both at low and high speeds of rotation.

Yet a further object resides in the provision of an impeller for a fluid transmission having alternately spaced fixed and movable impeller blades operative to progressively change the energy imparting characteristics of the impeller in accordance with variations of speed and load to which the transmission is subjected.

Another object of the invention resides in the provision of a fluid transmission having a fluid energizing impeller provided with backwardly directed blades effective to decrease fluid energization at low speeds of operation so as to permit an increase of engine speed effective to transmit heavy loads when the transmission is operating as a torque converter, and wherein the fluid energizing blades automatically assume a 90° position at higher speeds of operation so as to increase energization of fluid at higher speeds and thereby reduce slip.

Yet a further object is to provide a fluid transmission having spaced movable and fixed fluid energizing impeller blades effective to provide an impeller wherein all of the blades are of substantially the same relatively small diameter for operation at slow speeds to transmit large torque when the transmission is operating as a torque converter, and wherein some of the blades move radially outwardly in response to variations of load and speed to provide an impeller of larger effective diameter for operation as a fluid clutch when power is being transmitted at higher speeds with little or no torque multiplication.

A further object resides in the provision of a fluid energizing impeller for a fluid transmission wherein some of the blades are of fixed effective diameter and some of the blades move tangentially outwardly in response to variations of speed and load to increase the effectiveness of the impeller when the transmission is operating as a fluid clutch effective to transmit light loads at high speeds.

Other objects and advantages of this invention will be apparent from the following detailed description when considered in connection with the accompanying drawings in which.

Figure 1:
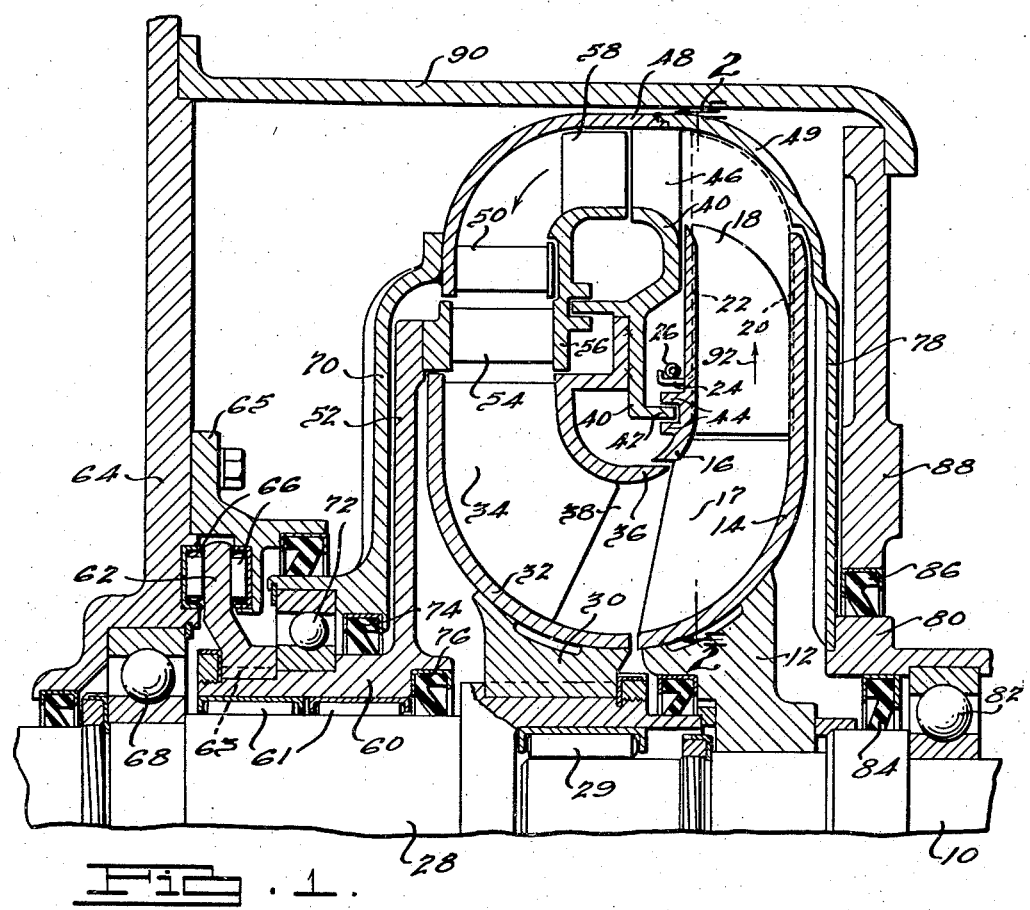
Fig. 1 is a longitudinal sectional view of a fluid transmission embodying the invention.

Referring to the drawings a driving shaft 10 has thereon an impeller hub 12 suitably secured against displacement as by splines. The hub 12 carries a web 14 secured to a shroud 16 as by fixed impeller blades 17. Substantially radially movable impeller blades 18 are slidably mounted in slots 20 and 22 in the web and shroud 14 and 16 respectively to move radially to the dotted line position illustrated.

Each movable impeller vane 18 is provided with a lug 24 extended through the slot 22 of the impeller shroud 16 and engaged by suitable yielding means such for example as a garter spring 26 to yieldingly urge the impeller vanes 18 inwardly as in the full line position and to yieldingly restrain the vanes in opposition to centrifugal forces to which the vanes are subjected during operation of the transmission.

A driven shaft 28 aligned with the driving shaft 10 and supported by a suitable bearing 29 carries a turbine hub 30. The hub 30 supports a web 32 having thereon fixed third stage turbine vanes 34 secured to a shroud member 36 to provide a turbine channel 38. The shroud 36 supports an auxiliary turbine shroud 40 having an axially extended flange 42 rotatable in a groove between spaced flanges 44 on the impeller shroud 16 to substantially prevent short circuiting of fluid in the power transmitting fluid circuit.

The auxiliary turbine shroud 40 has thereon first stage turbine vanes 46 positioned adjacent the outlet from the impeller and secured to a rotatable housing 48 having a contoured portion 49 conforming to the outer edges of the impeller vanes 18 as illustrated. The rotatable housing 48 has thereon second stage turbine vanes 50 for cooperation with the first stage turbine vanes 46 and the third stage turbine vanes 34 in absorbing energy from the circulating fluid in the power transmitting fluid circuit.

A flange 52 having guide vanes 54 interposed between the web 52 and a shroud 56 provides a second stage guide wheel to rectify the flow of fluid and direct it to the third stage turbine 34 in such a manner that power may be transmitted with torque multiplication, and the shroud 56 supports first stage guide wheel vanes 58 interposed between the first and second stages of the turbine for cooperation with the second stage guide wheel vanes 54 to rectify the flow of fluid to afford transmission of power with greater torque multiplication.

The guide wheel flange 52 has a hub 60 mounted on the driven shaft 28 as by bearings 61. A radially extended flange member 62 is secured to the hub 60 as by splines 63. A stationary housing 64 concentrically mounted on the driving and driven shafts has a flange 65 to over-lie the radially extended flange 62 on the guide wheel hub. Suitable one-way braking means 66 interposed between the flange 62 and the stationary housing 64 and flange 65 are provided to restrain the guide wheel hub 60 from backward rotation relative to the fluid circuit to operate the transmission as a torque converter when torque multiplication is desired.

When the load to which the driven shaft 28 is subjected decreases, or the speed of rotation increases to such a point that torque multiplication is unnecessary to carry the load the one-way braking means 66 permits the flange 62 to rotate in the forward direction of rotation of the impeller and turbine members whereupon the transmission functions as a fluid clutch to transmit power with substantially no torque multiplication.

Suitable bearings 68 are interposed between the driven shaft 28 and the stationary housing 64 to support the driven shaft. The rotatable housing 48 has an inwardly extended flange 70 journaled on the guide wheel hub 60 by bearings 72 and is sealed by an oil seal 74 to prevent loss of fluid from the power transmitting fluid circuit. Another oil seal 76 interposed between the guide wheel flange 52 and the driven shaft 28 is provided to prevent the escape of power transmitting fluid along the driven shaft 28.

The opposite side of the rotatable housing 48 is provided with an inwardly extended flange 78 secured to a rotatable member 80 mounted on the driving shaft 10 by a bearing 82 and is sealed therefrom by a fluid seal 84. Another seal 86 is interposed between the rotatable member 80 and a cover plate 88 carried by an axially extended portion 90 of the stationary member 64.

The operation of this transmission is as follows. Rotation of the driving shaft 10 is effective through the impeller hub 12 and web 14 to energize fluid in the impeller channel and direct it in the direction of the arrow 92. Energized fluid from the impeller channel is directed by the contoured portion 49 of the rotatable housing 48 to enter the first stage turbine vanes 46 whereupon a portion of the power is absorbed and the absorbed energy is directed through the turbine shroud members 40 and 36 and through the third stage turbine vanes 34 and turbine web 32 to the driven shaft 28. After leaving the first stage turbine vanes 46 the fluid passes through the first stage guide wheel vanes 58, thence to the second stage turbine vanes 50. Energy imparted to the second stage turbine vanes 50 is directed through the rotatable housing 48 and first section turbine vanes 46 to the driven shaft in the manner discussed above. Fluid leaving the second stage turbine vanes 50 passes through the second stage guide wheel vanes 54 and then through the third stage turbine vanes 34 where the remainder of the energy capable of extraction from the fluid is transmitted through the turbine web 32 to the driven shaft 28.

When the load to which the driven shaft 28 is subjected is such that torque multiplication is required to transmit the load, the one-way brake mechanism 66 interposed between the radially extended flange 62 on the guide wheel hub 60 and the stationary member 64 is effective to lock the guide wheel members 58 and 54 against rotation whereupon the fluid is redirected to enter the next succeeding turbine section in such a manner as to impart multiplied torque to the driven shaft 28. When torque multiplication is unnecessary, the one-way braking means 66 releases the guide wheel members to rotate freely in the forward direction whereupon power may be transmitted from the driving shaft 10 to the driven shaft 28 with substantially no torque multiplication while the transmission is operating as a fluid clutch.

When the transmission is functioning at low speeds the movable impeller blades 18 are yieldingly maintained in the retracted position as illustrated in full lines in Fig. 1, whereupon an impeller of relatively small diameter having backward inclined blades is provided to direct the energized fluid in a direction having a radial component. The energized fluid is deflected by the contoured portion 49 of the rotatable housing 48 to enter the first section turbine vanes 46 in a substantially axial direction.

As the speed of rotation of the driving shaft 10 and impeller increases, the centrifugal force to which the movable impeller blades 18 are subjected increases and the impeller blades 18 move outwardly against the resistance of the spring 26 to increase the effective diameters of the impeller. This outward movement is also influenced by fluid pressure because the blades are not radial but inclined. As the impeller continues to speed up the movable impeller blades 18 progressively move outwardly under the influence of centrifugal force and assume the dotted line position illustrated in Fig. 1 whereupon an impeller of considerably greater effective diameter is provided.

It will be noted that as the impeller blades 18 move outwardly, the angle of discharge from the impeller is changed from a radial discharge type to a substantial axial flow type from the backwardly inclined blades to substantially 90° blades whereupon the efficiency of the transmission of power at higher speeds is greatly increased.

Figures 2, 3:
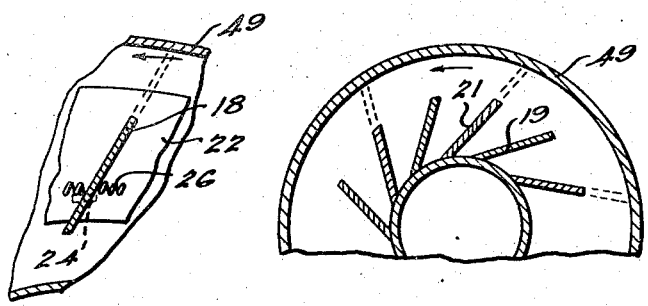
Fig. 2 is a sectional view on a reduced scale taken substantially on the line 2—2 of Fig. 1 looking in the direction of the arrows.
Fig. 3 is a view generally similar to Fig. 2 showing a modified form of the invention applied to an energy absorbing turbine or guide wheel member.

Referring to Fig. 2 it will be noted that the impeller blades 18 are tipped backwardly from a radial line against the direction of rotation. The efficiency of transmission of power at high speeds is greatly increased by the effective increase of the diameter of the impeller blades and the change in the angle of discharge from the impeller to a substantially 90° discharge angle.

Fig. 3 discloses a modified form of the invention applied to an energy absorbing turbine or guide wheel member wherein alternately spaced fluid deflecting members 19 are fixed, and the other alternately spaced fluid deflecting members 21 are movable axially under the influence of centrifugal force to which they are subjected. At low speeds these fluid deflecting members function the same as the embodiment illustrated in Figs. 1 and 2, and at higher speeds the effective diameter of the alternately spaced fluid deflecting members 21 increases while the effective diameter of the fluid deflecting members 19 remain stationary. This obtains the advantages as described but does not overload the engine.

Where the turbine or guide wheel members are provided with radially movable blades to form a turbine or guide wheel member having relatively small effective diameter at slow speeds of operation and having larger effective diameter at higher speeds of rotation the transmission will be so constructed that the operating section of the turbine or guide wheel member under consideration is operative while the fluid is flowing radially outwardly.

This is a continuation in part of my copending application Serial Number 337,037, filed May 24, 1940, now matured into Patent No. 2,351,516, of June 13, 1944.

I claim:

1. An impeller for a fluid transmission having spaced fluid energizing blades wherein alternately spaced blades are movable tangentially to the axis of rotation under the influence of centrifugal force, the remainder of the vanes being fixed.

2. An impeller for a fluid transmission having spaced fluid energizing blades wherein some of the spaced blades are movable tangentially to the axis of rotation under the influence of centrifugal force and the remainder of the blades are fixed.

3. An impeller for a fluid transmission having spaced fluid energizing blades, every other blade being fixed and the remainder of the blades being movable tangentially to the axis of rotation under the influence of centrifugal force, and means yieldingly resisting movement of the tangentially movable blades.

4. A guide wheel member for a fluid transmission comprising cooperative fluid deflecting blades arranged in sets, the blades of one set being fixed and the blades of the other set alternating with the fixed blades and being movable tangentially to the axis of rotation of the wheel under the influence of centrifugal force and fluid reaction, so as to increase the effective diameter of the guide wheel at high speeds of rotation.

JOSEPH JANDASEK.

REFERENCES CITED

The following references are of record in the file of this patent:

UNITED STATES PATENTS

| Number | Name | Date |
|---|---|---|
| 1,077,187 | Bissell | Oct. 28, 1913 |
| 1,569,473 | Garcia | Jan. 12, 1926 |
| 1,627,294 | Nydqvist | May 3, 1927 |
| 1,921,048 | Thomas | Aug. 8, 1933 |
| 2,005,193 | Mayo | Jan. 18, 1935 |
| 2,292,482 | Roche | Aug. 11, 1942 |

FOREIGN PATENTS

| Number | Country | Date |
|---|---|---|
| 15,261 | Great Britain | July 5, 1906 |
| 236,352 | Germany | July 6, 1911 |
| 390,721 | Great Britain | Apr. 13, 1933 |
| 457,132 | Great Britain | Nov. 23, 1936 |